US006865697B2

(12) United States Patent
Dettinger et al.

(10) Patent No.: US 6,865,697 B2
(45) Date of Patent: Mar. 8, 2005

(54) METHOD AND APPARATUS FOR REDUCED ERROR CHECKING OF DATA RECEIVED BY A SERVER FROM A CLIENT

(75) Inventors: Richard Dean Dettinger, Rochester, MN (US); Frederick Allyn Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 10/051,346

(22) Filed: Jan. 18, 2002

(65) Prior Publication Data

US 2003/0140284 A1 Jul. 24, 2003

(51) Int. Cl.[7] ................................................ G06F 11/00
(52) U.S. Cl. ......................................... 714/48; 714/43
(58) Field of Search ............................. 714/48, 43, 26; 709/100, 101

(56) References Cited

U.S. PATENT DOCUMENTS

| | | | | |
|---|---|---|---|---|
| 5,276,440 A | * | 1/1994 | Jolissaint et al. | 340/825.02 |
| 6,530,055 B1 | * | 3/2003 | Fukunaga | 714/746 |
| 2001/0054161 A1 | * | 12/2001 | Wooddruff | 714/27 |
| 2002/0112064 A1 | * | 8/2002 | Eastvold | 709/230 |
| 2002/0124214 A1 | * | 9/2002 | Ahrens et al. | 714/57 |
| 2003/0056145 A1 | * | 3/2003 | Kuth | 714/21 |

* cited by examiner

Primary Examiner—Scott Baderman
(74) Attorney, Agent, or Firm—Roy W. Truelson

(57) ABSTRACT

A server which service multiple clients according to a defined interface selectively determines whether to by-pass at least some error checks of client requests. Preferably, the client server interface uses a Java Database Connectivity (JDBC) API, there being a set of error checks associated with each type of request. For at least some error checks, the server selectively by-passes error checking. In the exemplary embodiment, the server by-passes error checking of certain error conditions at the client's request. Alternatively, the server might selectively by-pass error checking on the basis of the client's identity, or current server performance, or on a random or intermittent basis.

20 Claims, 10 Drawing Sheets

METHOD AND APPARATUS FOR REDUCED ERROR CHECKING OF DATA RECEIVED BY A SERVER FROM A CLIENT

FIELD OF THE INVENTION

The present invention relates to digital data processing, and in particular, to client/server interfaces in a distributed data processing environment.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Early computer systems were very expensive and difficult to use, capable of being programmed and manipulated by only a handful of highly-educated specialists. The cost of operating such computers was correspondingly high, and they were therefore used for only the most essential tasks. The dynamic which has driven the information revolution is the sustained reduction in the cost of computing. Thus, information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

The reduced cost of computing and the general availability of digital devices has brought an explosion in the volume of information stored in such devices. With so much information stored in digital form, it is naturally desirable to obtain wide access from computer systems. The volume of information dwarfs the storage capability of any one device. To improve information access, various techniques for allowing computing devices to communicate and exchange information with one another have been developed. Perhaps the most outstanding example of this distributed computing is the World Wide Web (often known simply as the "web"), a collection of resources which are made available throughout the world using the Internet. People from schoolchildren to the elderly are learning to use the web, and finding an almost endless variety of information from the convenience of their homes or places of work. Businesses, government, organizations and even ordinary individuals are making information available on the web, to the degree that it is now the expectation that anything worth knowing about is available somewhere on the web. Moreover, the web is not the only example of distributed computing. Many other distributed computing environments exist, often being non-public, but nevertheless containing very large stores of information. E.g. one or more so-called mainframe computers connected to multiple smaller computers or workstations via dedicated communications connections, a local area network, or otherwise, typically within a single company or organization, constitutes another type of distributed computing environment.

The web and many other distributed computing environments follow a client/server model. In a client/server model, information is typically exchanged as part of a two-way transaction, in which one device (a client) sends a request to another device (a server), the server then executing the request. The request is often a request for information stored by the server, but it may also be a request that the server store information from the client, that the server perform some processing of information from the client (which may be combined with other information), or may request some other service.

Although not always the case, there is a tendency to assign devices and systems in large computing network environments to specialized functions, so that certain devices or systems act primarily or exclusively as servers, while others act primarily as clients. Where this is the case, each server will typically service a very large number of requests, often from many different clients. Often, each individual request can be executed by the server in a very short time, but the cumulative number of requests can challenge the capacity of the server to respond in a reasonable time. Any operation that is performed with respect to a request, no matter how trivial, is multiplied many times when one considers the total workload of the server.

One type of operation that is performed repetitively be servers is error checking of input from the client. Various aspects of the request may be checked, such as the validity of the requested operation, the placement of fields, the range of values in the various fields, the validity of certain values, the validity of the communications connection, the authority of the client to make the request, and so forth. Individually, these are often rather trivial operations. However, each client request may cause multiple error checks to be performed, and these multiple checks for each request must further be multiplied by the number of requests the server receives. As a result, a server may devote a considerable proportion of its processing and other resources to making numerous error checks.

While there is a need for a certain amount of error checking, the error checking performed by servers is often redundant or unnecessary. Some clients perform some of the error checks themselves before submitting the requests to the server. Additionally, some client software which generates the request is so structured that it will never make certain types of errors which are checked, even though the software does not necessarily perform an explicit error check. Finally, there are some cases where the checked-for error is rare enough, and the consequences of its occurrence are not sufficiently important, that error checking the request at the server is not essential to the proper functioning of the distributed computing environment.

Although not necessarily recognized, there is a potential benefit to client/server methods and apparatus which intelligently and selectively reduce redundant or unnecessary error checking by the server.

SUMMARY OF THE INVENTION

A server receives requests for service from multiple clients over a distributed computing medium, each request having a defined interface. A pre-defined set of error checks which the server may perform is associated with each type of service request. With respect to at least some of the error checks, the server is able to selectively by-pass error checking.

In the preferred embodiment, the client server interface uses a Java Database Connectivity (JDBC) API. The physical connection between client and server could be almost any connection with which JDBC is compatible, including specifically the Internet. Each service request is normally checked at the server for certain conditions, as defined in the JDBC API. For at least some error checks, the server selectively by-passes error checking. I.e., some requests will cause the server to undertake full error checking, while others will cause the server to by-pass some of the error checks. In the exemplary embodiment, the server by-passes error checking of certain error conditions at the client's request. Alternatively, the server might selectively by-pass error checking on the basis of the client's identity, i.e., certain clients are deemed to not require error checking. In further alternatives, a server might by pass error checks based on how busy the server is, or on a random basis.

Certain types of error checks are not by-passed under any circumstances. Generally, any error check which prevents a security exposure, or prevents corruption of data on the server or in another client, should not be by-passed. But there are many checks which do not fall into this category, and which merely serve to validate the input stream so that errors are properly signaled to the requesting client. The consequence of by-passing such error checks may be, e.g., that the client receives something back which it would not otherwise receive. If the client itself has requested by-passing the error check, or if the parties' expectations are that the data returned to the client is not critical, it may be acceptable to by-pass error checking in some of these instances, and thereby improve server performance.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
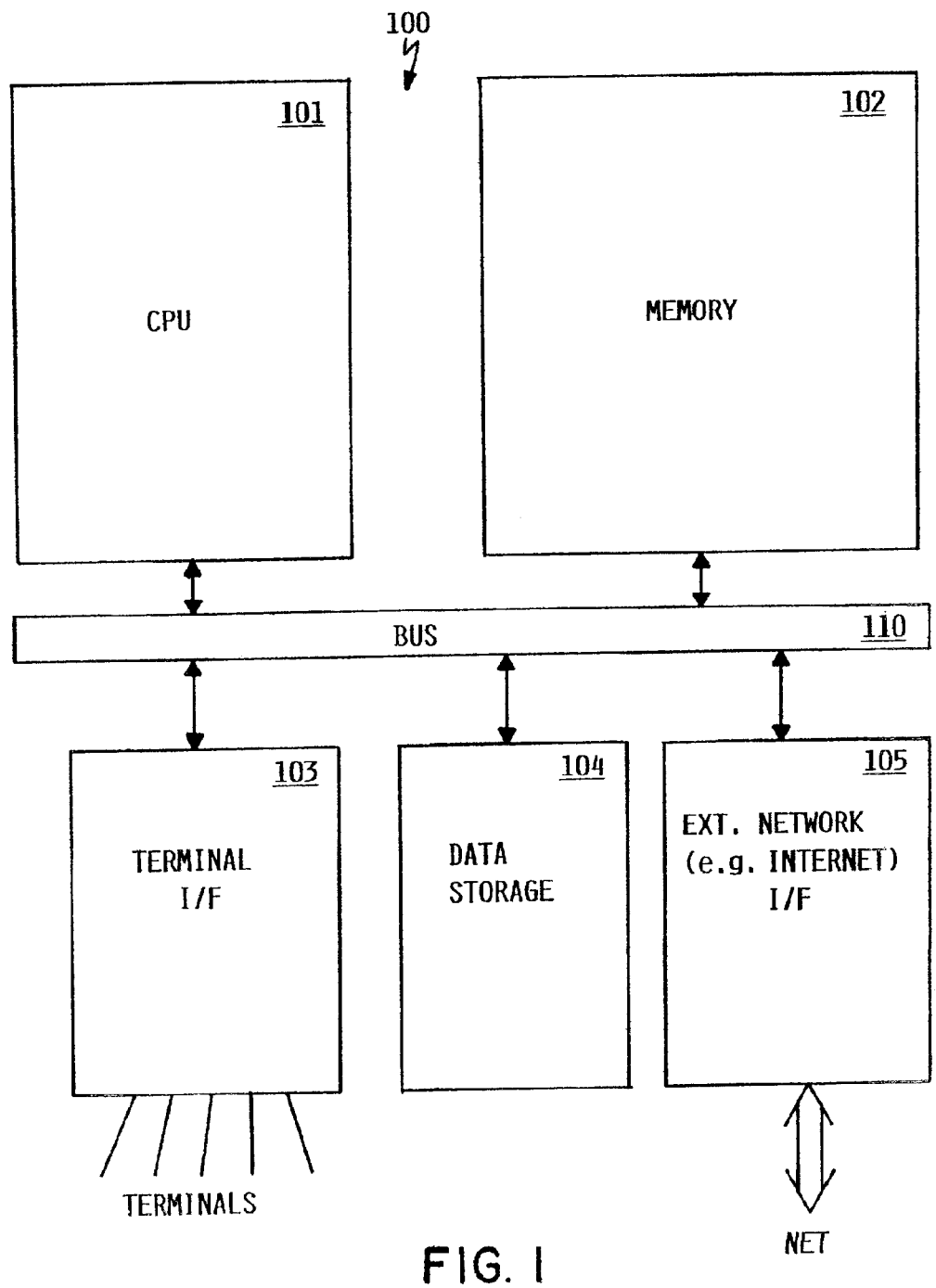
FIG. 1 is a high-level block diagram of a server computer system, according to the preferred embodiment of the present invention.

Referring to the Drawing, wherein like numbers denote like parts throughout the several views, FIG. 1 shows a high-level block diagram of a server computer system 100 acting as central repository of database information, consistent with the preferred embodiment. Computer system 100 comprises central processing unit (CPU) 101, main memory 102, terminal interface 103, data storage 104, and external network interface 105. The various devices communicate with each other via internal communications bus 110. CPU 101 is a general-purpose programmable processor, executing instructions stored in memory 102; while a single CPU is shown in FIG. 1, it should be understood that computer systems having multiple CPUs could be used. Memory is a random-access semiconductor memory for storing data and programs; memory is shown conceptually as a single monolithic entity, it being understood that memory is often arranged in a hierarchy of caches and other memory devices. Client terminal interface 103 provides a connection for transmission of data to and from multiple client workstations. This may be implemented in a variety of ways. Many large server computer systems (mainframes) support the direct attachment of multiple terminals through terminal interface I/O processors, usually on one or more electronic circuit cards. Alternatively, interface 103 may provide a connection to a local area network. Various other alternatives are possible. Data storage 104 preferably comprises one or more rotating magnetic hard disk drive units, although other types of data storage could be used. External network interface 105 provides a physical connection for transmission of data to and from an external network, such as the Internet, and could use any of various available technologies. It is possible that clients may be attached remotely through the Internet or other remote network connection. Communications bus 110 supports transfer of data, commands and other information between different devices; while shown in simplified form as a single bus, it is typically structured as multiple buses, and may be arranged in a hierarchical or other form. The computer system shown in FIG. 1 is intended to be a simplified representation for purposes of illustration, it being understood that many variations in system configuration are possible in addition to those specifically mentioned here. While system 100 could conceivably be a personal computer system, a server is more typically supported on a larger computer system such as an IBM zSeries™ system, an IBM iSeries™ system, or an IBM pSeries™ system.

Figure 2:
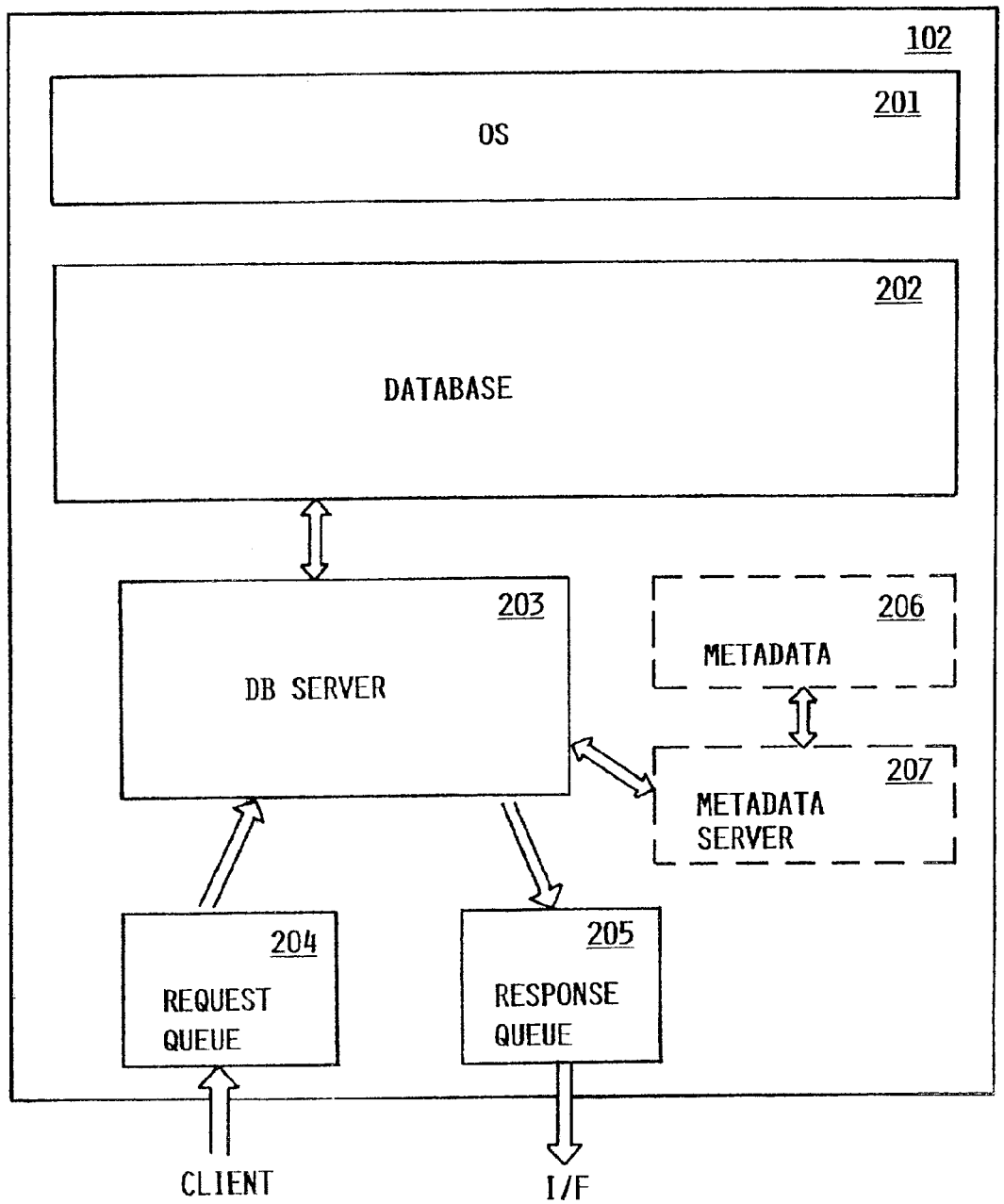
FIG. 2 is a conceptual illustration of the major software components of the server computer system, according to the preferred embodiment.

FIG. 2 is a conceptual illustration of the major software components of server system 100 in memory 102. Operating system 201 provides various low-level software functions, such as device interfaces, management of memory pages, management of multiple tasks, etc. as is well-known in the art. A database 202 contains data which is maintained by the server system and for which the server provides access to various clients. Database 202 might contain almost any type of data which is provided to clients by a server. Examples of data which might be stored in database 202 include web pages, photographic images, computer programming code, accounting data, customer orders, inventory, calendar data, forms and documents, directories, and many others, it being understood that the types of data listed are by way of illustration and not by way of limitation. Access to the data by the clients might be read-only, or might be read/write. Although only one database 202 is shown in FIG. 2, the server system may contain multiple databases, and one or more databases could be stored in a distributed format on multiple server systems.

Request queue 204 temporarily stores requests from client for access to the database 202. Various types of requests may be serviced by server 100. For example, some requests may be in the nature of read requests (i.e, requests for data from the database, without changing the data), while others are in the nature of write requests (i.e., requests to change some data in the database). Furthermore, there may be many different types of read requests or write requests, each accessing different data or requesting different operations on the data. For example, one form of read request may request data from a specific, known record, while another form of read request may be in the nature of a query, in which all records in the database are matched to some specified search criteria, data from the matched records being returned. Furthermore, data is may be read from or written to database 202 directly, or may require manipulation or combination with other data. Requests are serviced generally by database server 203. Although database server 203 is shown as a single entity in FIG. 2, it may in fact contain multiple functions for handling different types of requests. Responsive information generated by database server 203 is placed on response queue 205, for transmission to the requesting client. A response may be information obtained or derived from the database, or it may simply be an acknowledgment that some operation was performed.

In accordance with some implementations of the present invention described below, server system also includes metadata 206 and metadata server 207. Metadata 206 is a special database, which contains data about clients, service requests, and so forth, used internally by the server system. This is data which is not generally provided to clients, but which is generated by the server system from client requests to enable the server to more efficiently handle requests, track errors, etc. In accordance with some embodiments herein, metadata 206 may include a level of trust or reliability indicator for each client, or historical statistics concerning serviced requests and error frequency. Metadata 206 may include other data unrelated to any decision on the part of the server to by-pass error checking. Metadata server 207 maintains the metadata 206, and accesses the data on behalf of database server 203 when necessary to respond to a client service request.

While the software components of FIG. 2 are shown conceptually as residing in memory, it will be understood that in general the memory of a computer system will be too small to hold all programs and data simultaneously, and that information is typically stored in data storage 104, comprising one or more mass storage devices such as rotating magnetic disk drives, and that the information is paged into memory by the operating system as required.

Server computer 100 and its components are shown and described in FIGS. 1 and 2 as a more or less single, self-contained computer system. It is possible to implement a server in such a manner. It is alternatively possible to use multiple computer systems, particulary multiple systems which share a single large database, each having a specialized task. For example, one or more computer systems could be dedicated to database maintenance, while one or more other computer systems are dedicated to servicing requests for information. References herein to a "server" should be understood to include either a single computer or a collection of computer systems which respond to requests from clients.

Figure 3:
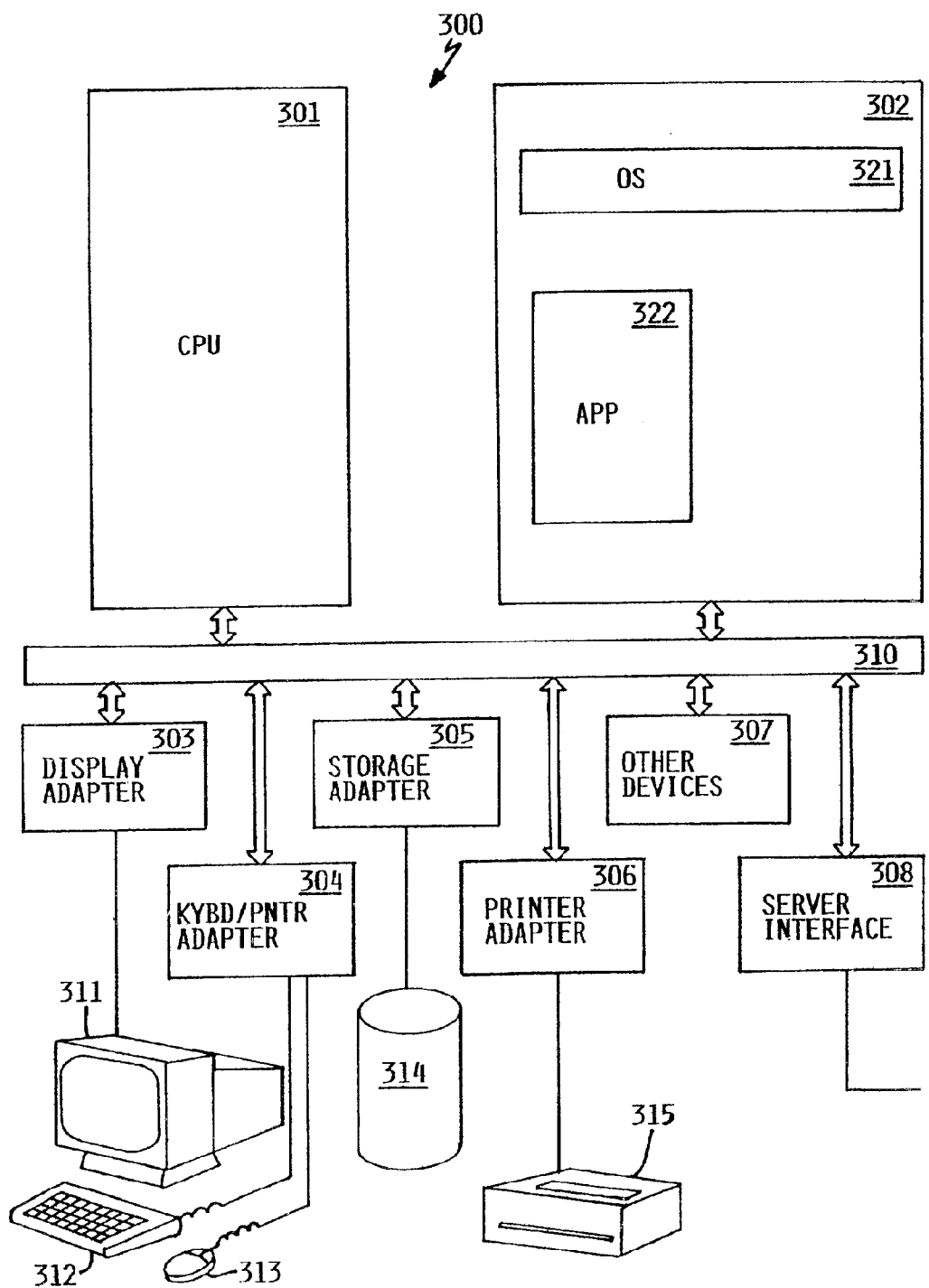
FIG. 3 is a high-level block diagram of a typical client workstation which generates requests to a server, according to the preferred embodiment.

FIG. 3 illustrates a typical client computer system 300 (workstation) from which requests for data are submitted. Client computer system 300 includes CPU 301, main memory 302, various device adapters and interfaces 303–308, and communications bus 310. CPU 301 is a general-purpose programmable processor, executing instructions stored in memory 302; while a single CPU is shown in FIG. 3, it should be understood that computer systems having multiple CPUs could be used. Memory is a random-access semiconductor memory for storing data and programs; memory is shown conceptually as a single monolithic entity, it being understood that memory is often arranged in a hierarchy of caches and other memory devices. Communications bus 310 supports transfer of data, commands and other information between different devices; while shown in simplified form as a single bus, it may be structured as multiple buses, and may be arranged in a hierarchical form. Display adapter supports video display 311, which is typically a cathode-ray tube display, although other display technologies may be used. Keyboard/pointer adapter 304 supports keyboard 312 and pointing device 313, depicted as a mouse, it being understood that other forms of input devices could be used. Storage adapter 305 supports one or more data storage devices 314, which are typically rotating magnetic hard disk drives, although other data storage devices could be used. Printer adapter 306 supports printer 315. Adapter 307 may support any of a variety of additional devices, such as CD-ROM drives, audio devices, etc. Server interface 308 provides a physical interface to server 100. Such an interface may be a remote connection through the Internet, or a local area network such as an Ethernet or token ring network, or a mainframe terminal channel interface, such as might be used to connect multiple workstations to a single larger mainframe computer used as a server. Many other types of interface are possible. Computer system 300 will typically be any of various models of single-user computer systems known as "personal computers". The representation of FIG. 3 is intended as an exemplary simplified representation, it being understood that many variations in system configuration are possible in addition to those mentioned here. Furthermore, a client system for requesting data from a server need not be a personal computer system, and may be a so-called dumb terminal attached to a mainframe, a notebook or laptop computer, a special-purpose device, or any of various hardware variations.

As shown in FIG. 3, operating system 321 and distributed data application 322 reside in memory 302. Operating system 321 provides various low-level software functions, such as device interfaces, management of memory pages, management of multiple tasks, etc. as is well-known in the art. Distributed data application 322 could be any application which accesses remote data on a server as part of its function. Examples of such distributed data applications include Internet browsers; transactional applications such as sales, banking, calendar and reservation systems, insurance, and so forth; computer code development applications in which multiple developers access a common database of code; and many others. A single distributed data application is illustrated by way of example in FIG. 3, it being understood that a client system may have multiple different distributed data applications, which may access the same server or different servers.

Figure 4:
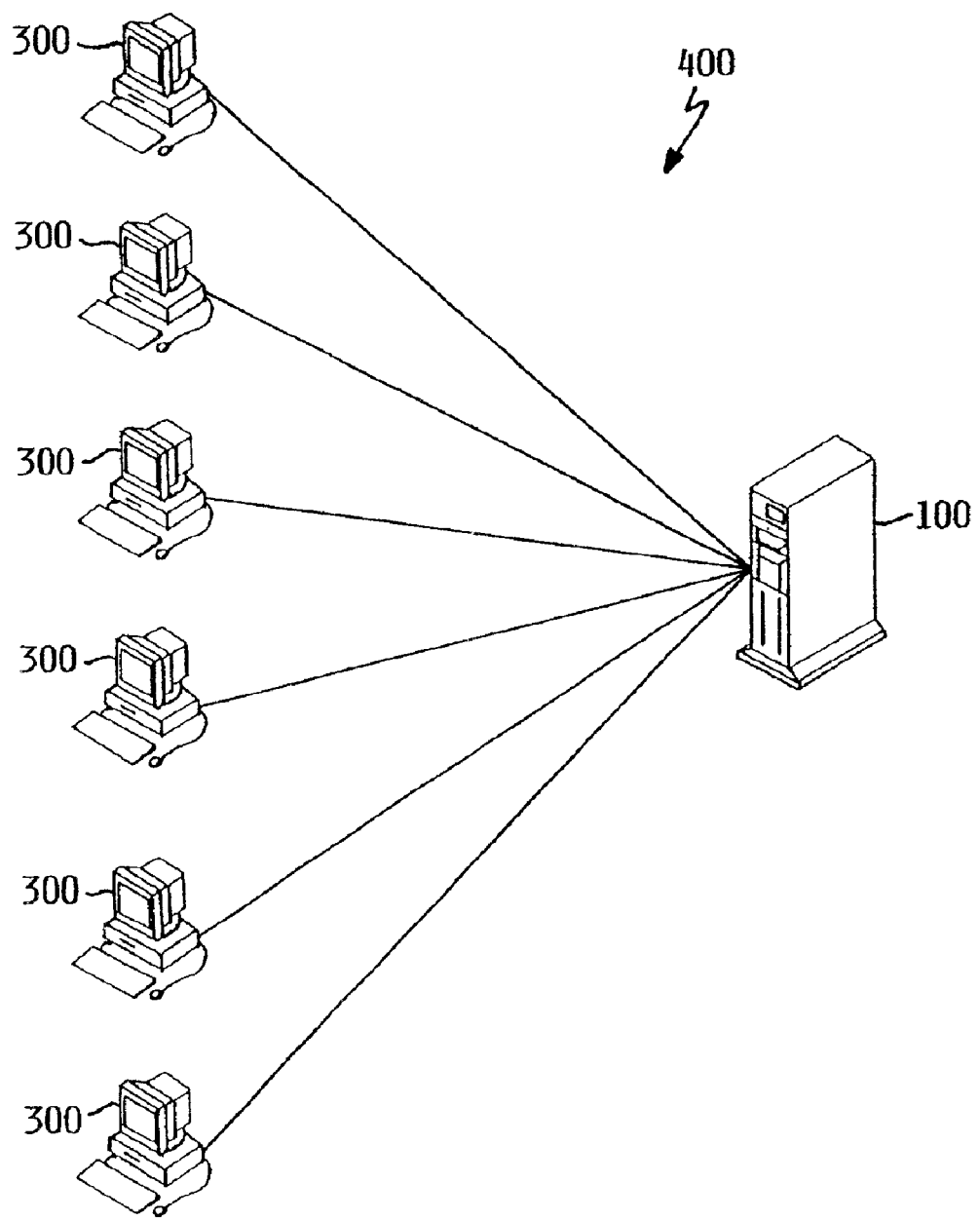
FIG. 4 is a simplified block diagram illustrative of a network for servicing requests from clients, in accordance with the preferred embodiment.

FIG. 4 is a simplified block diagram illustrative of a network for servicing requests from clients, in accordance with the preferred embodiment. The network 400 comprises server computer 100, and multiple workstations (clients) 300, all coupled to a communications medium. The communications medium may be, e.g., the Internet, a local area network such as a token ring or Ethernet, or other, including wireless communications media. Additionally, the network may be a host mainframe computer which is attached through channels to multiple workstations. It will be understood that the network of FIG. 4 is a simplified conceptual illustration, and that in practice networks may encompass hundreds or thousands of workstations, may have multiple servers, and may have very complex topologies.

In accordance with the preferred embodiments of the present invention, server 100 receives multiple requests from multiple clients 300 over distributed computing medium 400, each request requiring access to data in database 202. The requests observe a pre-defined interface (also known as a protocol), which is often a public interface or protocol that can be employed by almost any suitably programmed client, although it may be a private interface or other special interface. This generally means that the request must follow a specific format and contain certain information. The request for service may actually involve multiple exchanges between client and server, e.g., an acknowledgment of receipt of a request by the server, a solicitation by the server for additional information and response by client, a final response by the server containing requested information, an acknowledgment of receipt of response by the client, and so forth.

The server may perform a pre-defined set of error checks with respect to each type of service request. I.e., the requested operation and operation parameters determine a pre-defined set of error checks, which the server may perform. These error checks may be specified by the interface, or they may be error checks that are simply programmed into the server independently of any interface specification. With respect to at least some of the error checks, the server is able to by-pass error checking for selected service requests.

In the preferred embodiment, the client-server interface uses a Java Database Connectivity (JDBC) API. The JDBC API is a general-purpose client-server interface supporting a variety of different types of requests for database information. JDBC is compatible with many different types of physical connections between client and server, including specifically the Internet.

For each type of request, there is an associated set of error checks performed at the server level. The errors which are checked for by this set of error checks may be of differing types, having a range of different consequences. Some error types may have the potential to corrupt information stored on the server, to compromise server security, or to otherwise interfere with server operations. Errors of this type should always be checked. However, there are other types of errors which, if made, have less severe results. For example, many errors in read requests have only the potential to degrade the responsive information provided to the client. Among these types of errors, further distinctions may be made between errors which may result in false information, or errors which may cause lack of response or missing information. In general, these consequences are less serious, and may in appropriate circumstances be risked. Therefore, for a given set of error checks associated with a given type of request, there may be a subset of the error checks which can be by-passed without compromising the integrity of the server system. The set of error checks and subset of by-passable error checks will vary for each type of request, and for some types of request, particularly write requests, there may be no error checks which can be safely by-passed.

A simple example of a set of error checks which may be by-passed may be shown with respect to the JDBC call to getInt( ). This is a very simple function which takes in a column index that must be between 1, and the number of columns in the results of a query, and returns the value from that column number represented as an integer. A reasonable implementation of getInt( ) as a server side service might be the following actions:

1. Check that the Connection is still active
2. Check that the Statement is not closed
3. Check that the ResultSet is not closed
4. Check that the cursor is on a row
5. Check that the ResultSet is not positioned to an insert row
6. Check that the column index is between 1 and the column count
7. Check that converting the given column type to an integer is valid
8. Covert the column value to an integer (if its not an integer)
9. Return the column value or its integer representation Of the nine actions enumerated above, the first seven are error checks which verify that the client did not make some mistake in issuing the request. Only actions 8 and 9 relate directly to responding to the request. Furthermore, none of the error checks is really necessary to preserve the integrity of the server. The consequence of an unchecked and undetected error is either that the server does not respond at all, that it responds with incomplete information, or that it responds with a value which is not necessarily correct. For example, if action #1 is not performed and the connection is closed, the server may simply not respond or may respond with an error message which may be incomplete. If, on the other hand, action #7 is not performed and the data type can not be converted to an integer, the server may respond with an unexpected error message, or may respond with an unexpected value (e.g., 0), or may respond with an unconverted value, depending on how data conversion is implemented. In any case, server operations are not affected, and the client merely receives garbage out as a consequence of submitting garbage in.

In the simplified example above, all operations which are in the nature of error checks can probably be by-passed without compromising server integrity. However, it will readily be understood that, even in the case of requests to read data, some of the error checks might be essential. An obvious example is an access or security check to assure that the client is authorized to access the data. Other essential error checks may be implementation dependent.

In the example request above, it will be observed that a substantial amount of the server's processing time in this simple example will be devoted to checking errors. Although this is a very simple example, more complex requests generally require more sophisticated error checking as well, and so by-passing of unnecessary error checks may yield significant performance gains for the complex as well as the simple requests.

An example in which the error checking (validation) can be much more resource-intensive than the actual request processing is in developing web services. Web services are often coded as XML document request/response pairs. XML parsers are used to break these XML documents into data structures which programs can use and manipulate. XML parsers further are used to build up XML documents after the request has been completed. Typical XML parsers have both validating and non-validating modes. When a parser is validating a document, it ensures that the document strictly adheres to a specific format as it parses the document. This mode of operation is typically very resource-intensive in comparison to a non-validating mode. The methods described herein would allow the validation error checking of a server-based parser to be avoided for selected clients or requests based on the criteria described elsewhere, which could significantly improve server throughput. Those skilled in the art will recognize that many other such opportunities for application of this invention exist.

Figure 5:
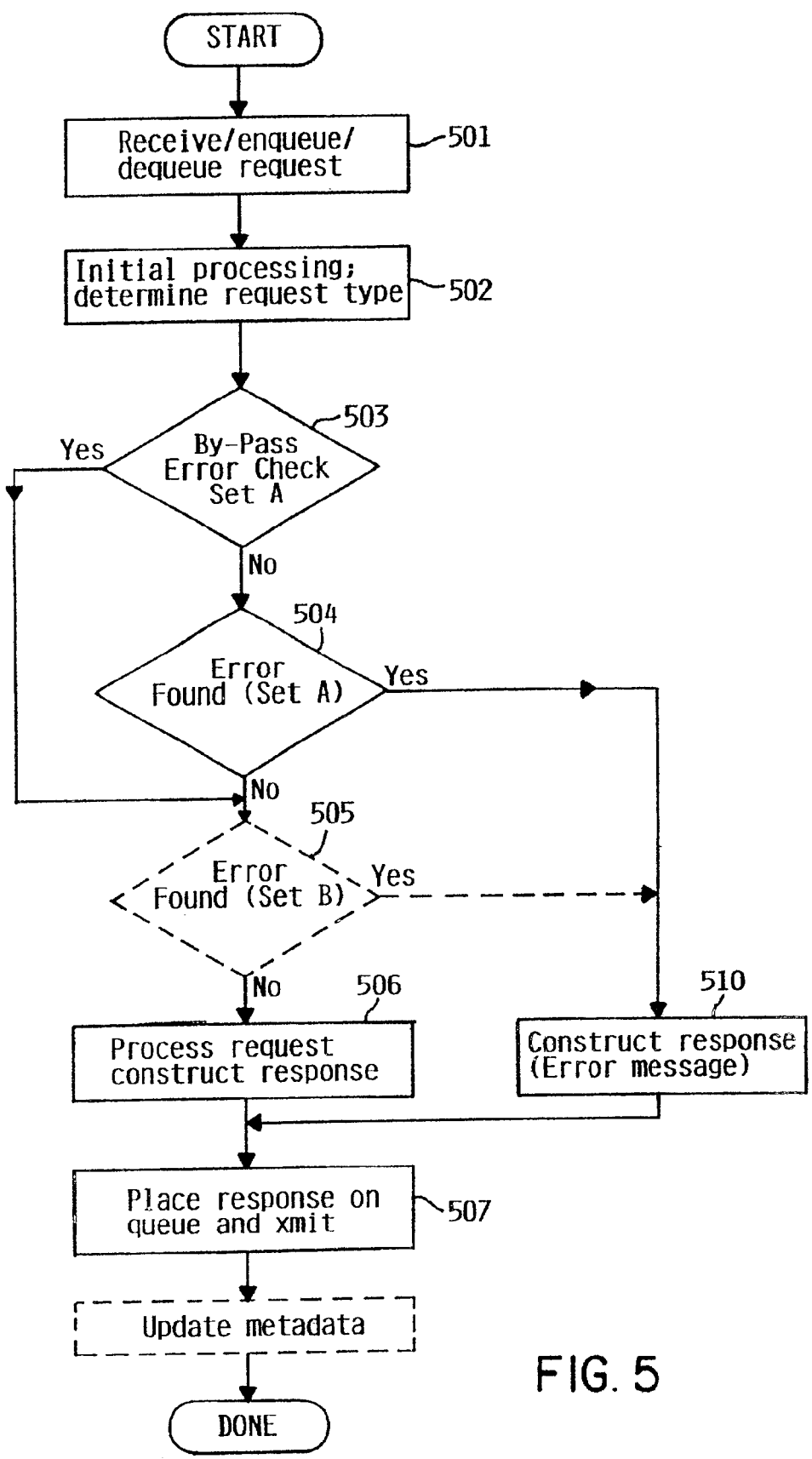
FIG. 5 is a high-level flow diagram of the generalized process in a server for responding to a client request, according to the preferred embodiment.

FIG. 5 is a high-level flow diagram of the generalized process in a server for responding to a client request, according to the preferred embodiment. A request generated by a client 300 is typically received by server 100, enqueued in request queue 204, and dequeued when the database server 203 is ready to process the request (step 501). The database server performs some initial processing of the request, in which the type of request is identified (step 502). The type of request dictates the actions to be taken in response, and all particularly, the set of applicable error checks which might be performed.

The server then determines whether some subset of the error checks associated with the type of request should be by-passed (step 503). This subset is designated "Set A" in FIG. 5, and may comprise the entire set of error checks associated with requests of the type being made. As explained above, error checks of Set A should be checks which, if by-passed, will not compromise the integrity of the server system. The determination made at step 503 may take any of various forms, as discussed in greater detail with respect to FIGS. 6A–6D below. If the error checks of Set A should not be by-passed, these error checks are performed (step 504); otherwise, step 504 is by-passed, shown as the "Y" branch from step 503. Although a single step 503 and a single step 504 is shown, it would alternatively be possible to divide the error checks of Set A into multiple further subsets, and to have a separate determination step 503 for each.

If no errors are detected from error check Set A, or if error check Set A is by-passed, the server may perform additional error checks which are not by-passed, designated "Set B" in FIG. 5 (step 505). The error checks of Set B might be error checks which can't be by-passed because to do so would compromise the integrity of server system 100, or they might be error checks which the server decides to perform in all cases even though not essential. For example, they might include error checks which can be performed very quickly, so that little if anything is gained by by-passing them. Step 505 is shown as a dashed outline, because there might be no error checks in Set B. If no errors are detected in step 505 (or if there are no applicable error checks in Set B), the server proceeds to process the request and construct a response, accessing data from database 202 as necessary (step 506). The response is then placed on response queue 205 and eventually returned to the requesting client (step 507).

In any of various embodiments in which metadata concerning individual clients, request history, and so forth, is generated, the metadata server 207 updates metadata 206 to reflect the results of the current request. This step is represented as the dashed block 508 in FIG. 5, it being understood that in some embodiments described herein no metadata is collected, and step 508 is not performed. The nature of this metadata update depends on the type of metadata collected. For example, metadata may be collected concerning error frequency, which may be on an individual client basis, for groups of clients, or for all clients collectively; whatever the case, the error frequency data would be updated by the results of the current request, possibly by incrementing an error counter if an error was found, and by incrementing a request counter whether or not an error was found.

If an error is detected at either step 504 or step 505, further processing is aborted, and an appropriate response (which is generally an error message) is constructed (step 510). This response is then placed on response queue 205, and returned to the requesting client (step 507), and metadata is updated as necessary (step 508).

The determination when to by-pass one or more error checking actions, represented generically in FIG. 5 as step 503, can be based on any of various factors, and may include combinations of these factors. Several different embodiments of this determination are represented in FIGS. 6A–6D.

Figure 6A:
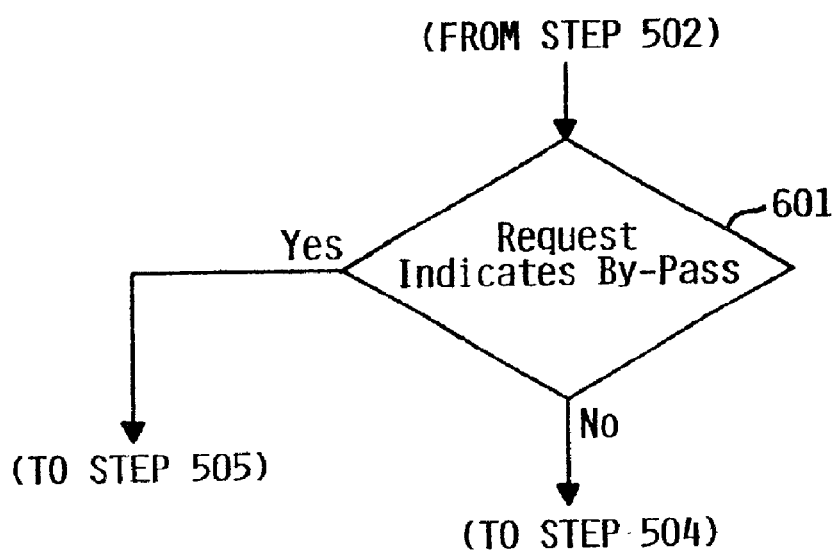
FIGS. 6A–6D are flow diagrams showing in greater detail several alternative implementations of the process of determining whether to by-pass certain error checking actions, according to various preferred and alternative embodiments of the present invention.

In the preferred embodiment, represented in FIG. 6A, certain error checking actions are by-passed at the request of the client. I.e., the client passes parameter indicating whether error checking should be by-passed as part of the request. The server extracts the parameter indication from the request, and if the parameter indicates that error checking is to be by-passed, error checking of Set A is by-passed (step 601). Preferably, the parameter is an option which, if present, indicates that error checking is to be by-passed. I.e., by default, error checking is performed unless the client indicates otherwise. However, this preference could easily be reversed, so that error checking is not performed by default, and is only performed where the client requests it.

Reduction of error checks benefits the server by reducing its workload. The benefit to the requesting client is less direct. Reduction in server workload improves response time, but this improvement is something which benefits clients generally, not specifically the client(s) which requested that error checks be by-passed. Although some clients therefore have little incentive to request that error checking be by-passed, there are circumstances in which this approach can yield significant performance benefits. A classic example would be a situation in which the server, as well as certain clients, are created and/or maintained by the same entity. In this case, a business or other organization may maintain database 202 on a server computer system 100, which is both used internally by the organization, and which is made available to clients outside the organization. If a significant percentage of use is by clients in the organization, the organization has control of these in-house clients. It may assure itself that the in-house clients are generally presenting requests in proper form so that few, if any, actual errors are made in the requests. At the same time, it may require the in-house clients to include the parameter by-passing error checking in their service requests so that the burden on the server is relieved.

Figure 6B:
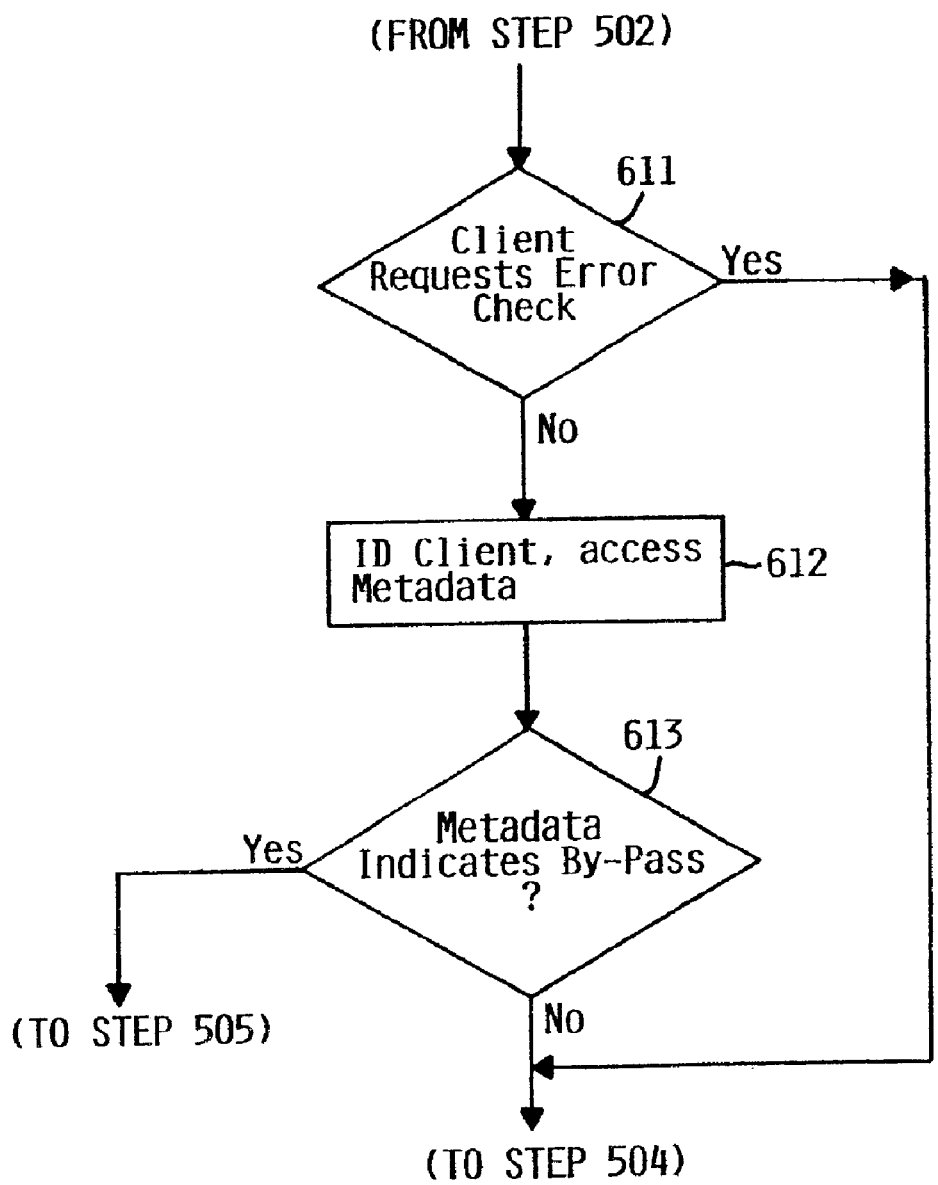

A first alternative determination of whether to by-pass error checks is represented in FIG. 6B. In this approach, the server maintains metadata with respect to the clients, and makes the decision to by-pass error checking for certain clients, but not others. As shown in FIG. 6B, the server first determines whether the client specifically requested error checking (step 611), and if so, the "Y" branch is taken, which forces error checking in all circumstances. Allowing the client to specifically request error checking is useful for debug of unusual or error conditions, or may be necessary for compliance with an interface specification. If the client makes no specific direction, the default is that the server determines whether to perform certain error checks on the basis of metadata, i.e., the "N" branch from step 611. The server then uses some form of identifier associated with the client to access client information in its metadata database 206 (step 612). Based on the metadata, the server determines whether or not to by-pass the error checks (step 613).

The metadata upon which the by-pass determination is made can take any of various forms. In its simplest form, the metadata contains a static flag for each client, indicating whether error checks on requests from the client should be by-passed. This flag could be under the control of a system administrator, and thus only certain trusted clients (e.g., in-house clients, or known business partners) might be allowed to by-pass error checks. However, the metadata could be much more sophisticated. For example, statistical metadata could be collected and updated each time a request is serviced. If a particular client or group of clients has a history of "good behavior", the server may at some point automatically determine that the client is "trustworthy" and therefore by-pass error checking of that client or group of clients. "Good behavior" on the part of the client may mean that the requests from that client do not contain errors found in error checks, but could mean other things as well. For example, client behavior that indicates that the client is not a well designed client might be taken as an indication that it should not be trusted. A classic JDBC example is a client application that holds Connection objects for long periods of time or doesn't close resources itself when done with them.

Figure 6C:
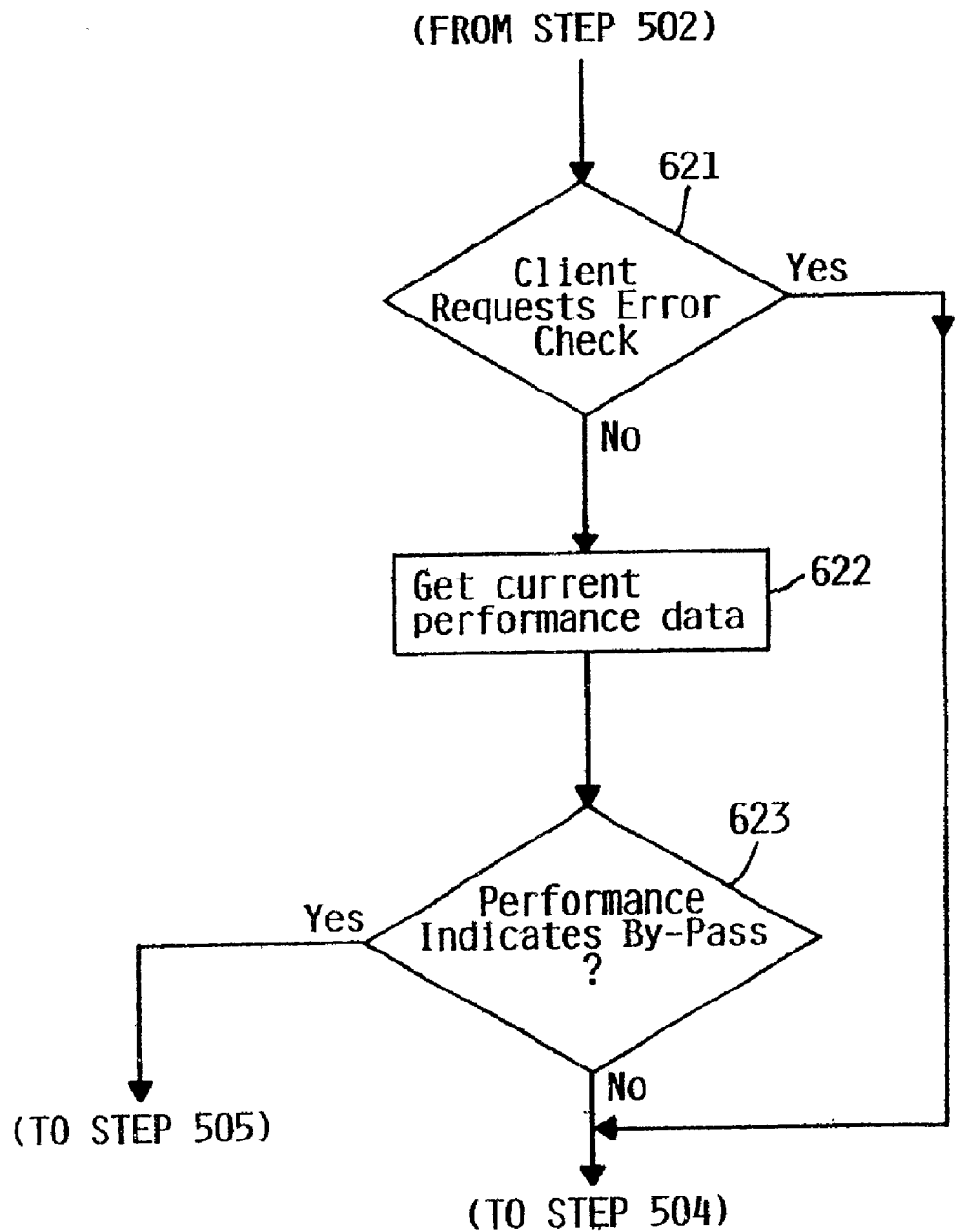

A second alternative determination of whether to by-pass error checks is represented in FIG. 6C. In this approach, the server by-passes error checking based on current server performance, i.e., when the server is very busy. As shown in FIG. 6C, the server first determines whether the client specifically requested error checking (step 621), and if so, the "Y" branch is taken, which forces error checking in all circumstances. The server then obtains the relevant current performance data (step 622). Based on this data, the server makes the determination whether to by-pass error checking (step 623). Any of various indicia of performance can be used to make the determination at step 623, but since the purpose is to reduce the burden on the server, the determination should use a simple performance indicator rather than complex statistics which require significant calculation. Examples of simple indicators include (a) the length of the request queue 204, (b) the amount of time that the current request has been in the request queue 204, and (c) the overall CPU utilization in the server. If the server has a regular pattern of use based on time of day/day of week, it might be possible to make the determination to by-pass based on these factors.

Figure 6D:
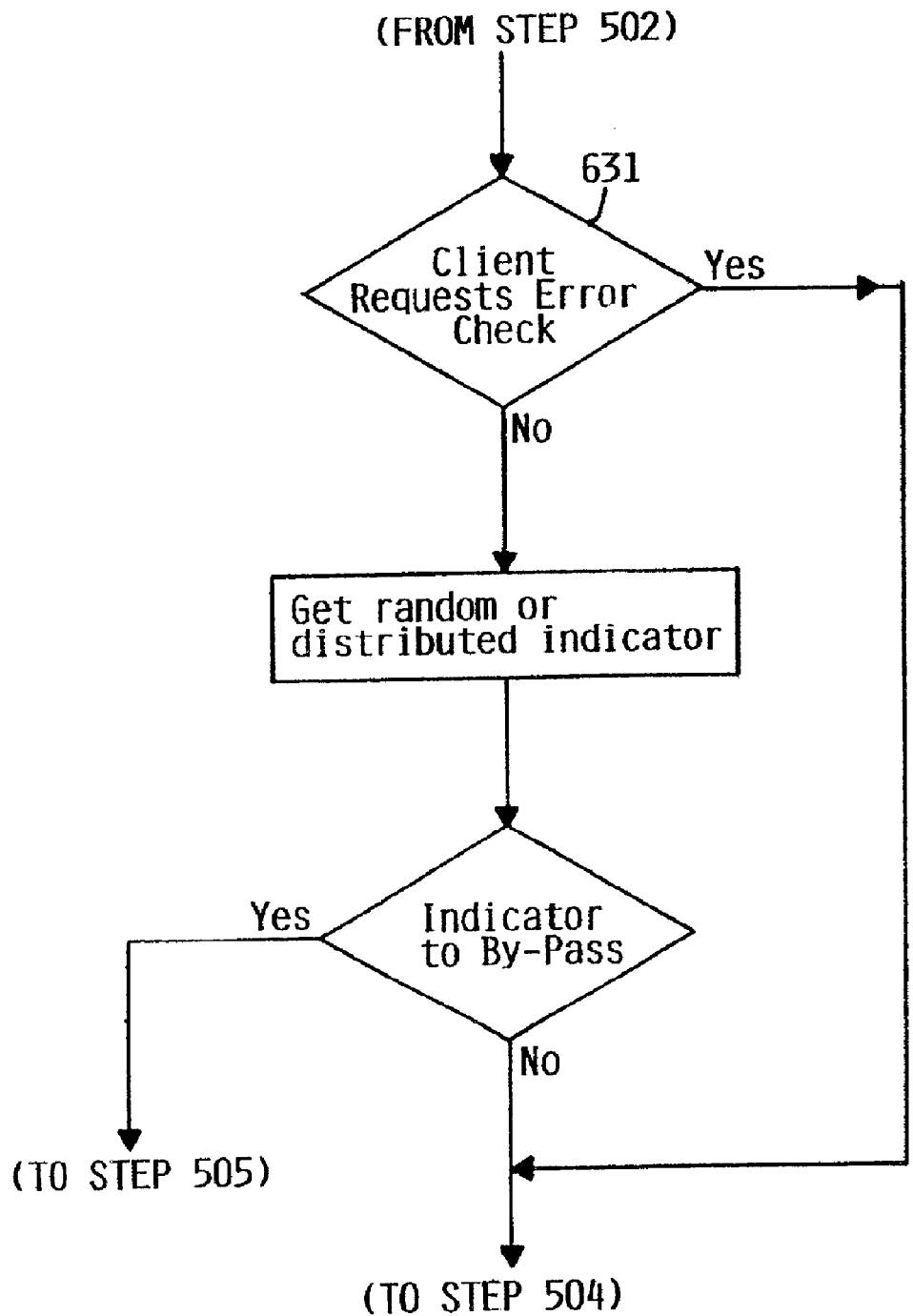

A third alternative determination of whether to by-pass error checks is represented in FIG. 6D. In this approach, the server by-passes error checking on a random or distributed basis. As shown in FIG. 6D, the server first determines whether the client specifically requested error checking (step 631), and if so, the "Y" branch is taken, which forces error checking in all circumstances. The server then obtains a random or distributed indicator (step 632). Based on this indicator, the server makes the determination whether to by-pass error checking (step 633).

The theory of random or distributed error checking is that error checking is something which should be performed only to the extent that the server will benefit from identification of performance problems. If errors are not occurring very frequently, it may be best to perform only occasional "spot checks" for errors, rather than to check every single request. The indicator could be based on a random number generator, but since true randomness is not really necessary, other methods will suffice, e.g, to perform error checking of every Nth request. In general, it is expected that the substantial majority of requests will not be checked for errors.

The frequency of error checking using the random or distributed alternative may be fixed, or may be variable depending on other factors. For example, if the server system is experiencing a relatively large number of errors, the server might increase the frequency of error checking.

Any of the techniques described above may be combined with other such techniques in making the determination to by-pass error checking. In the case of random or distributed error checking in particular, it may make sense to vary the frequency or probability of error checking based on current system performance or client metadata. For example, the system may use a basic distributed or "spot checking" approach, in which every Nth request is checked, where N varies with some indicator of current system performance, so that spot checks are more frequent when the system is less busy, and decrease in frequency as the system becomes busier. Additionally, spot checking might be combined with the collection of client metadata, so that metadata is collected during the random or distributed spot checks. If, in these circumstances, a particular client shows a large number of errors which are affecting the system, some action (such as terminating the client's connection) could be taken.

Figure 7:
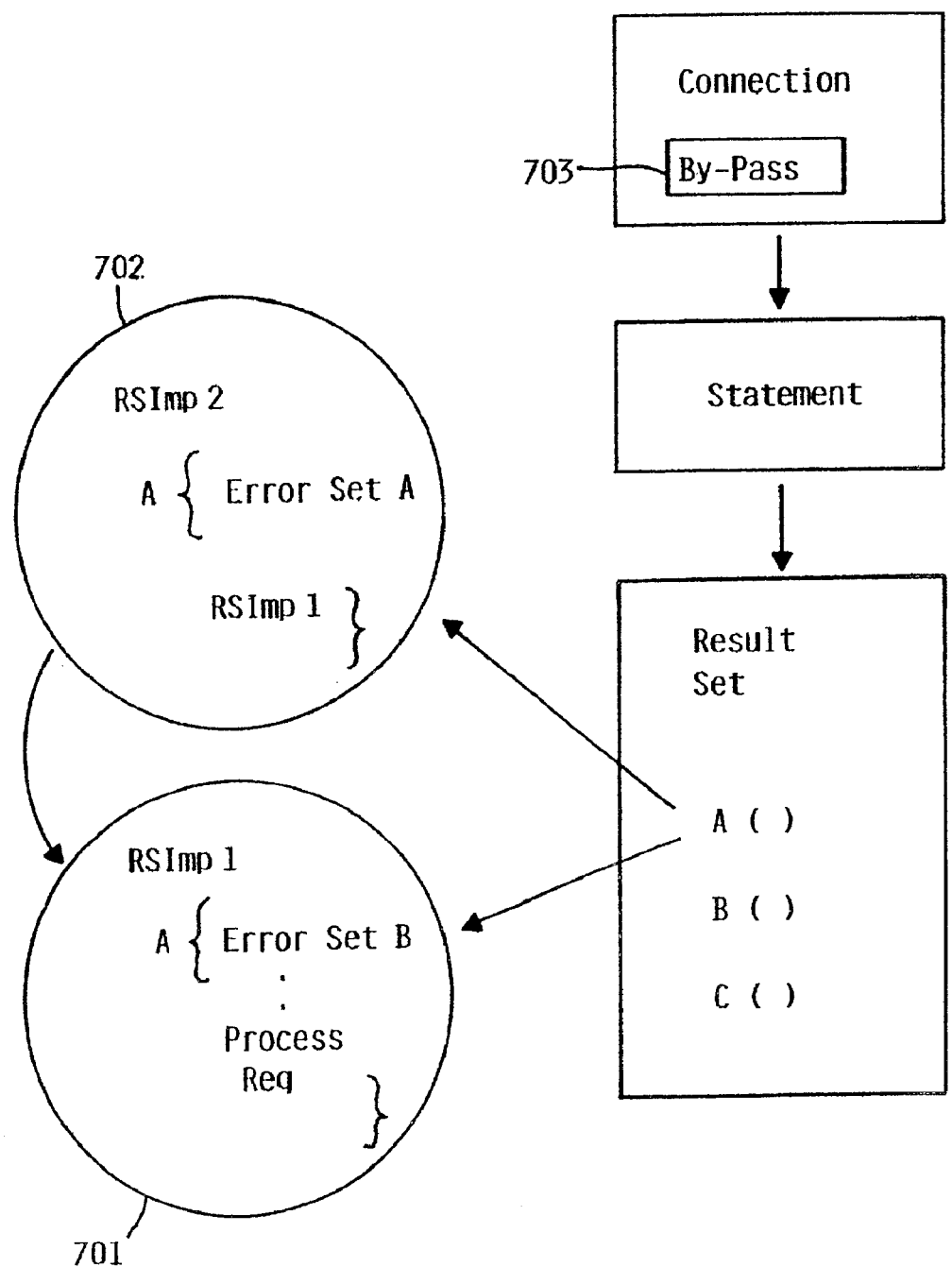
FIG. 7 is an illustration of a JDBC implementation in the server of selective by-passing of certain error checks, according to an embodiment of the present invention.

The generalized flow diagrams illustrated in FIGS. 5 and 6A–6D can be implemented using any suitable computer programming code. For example, it is possible to implement all decisions using a sequence of "IF" statements or equivalents in any procedural language. However, in the preferred embodiment, the capabilities of object-oriented programming are utilized to implement the interface. FIG. 7 is an illustration of this implementation in the server.

As shown in FIG. 7, JDBC defines Connection 704, Statement 705 and Result Set 706 objects of a client-server interface, these objects residing on the server. Two implementations of the interface for a particular type of request exist on the server, identified as RSImp1 701 and RSImp2 702. RSImp1 is the basic implementation which generates the results, and which contains any error checks which are always performed (i.e., Set B). RSImp2 contains error check set A, and a call to RSImp1.

The client request passes the parameter to by-pass error checking as a Connection property 703. This by-pass property is passed to the Statement, which invokes a factory method to create the ResultSet. The by-pass property determines the form of the ResultSet, i.e., which implementation is called by the ResultSet to generate results. If the client requested that error checking be by-passed, the ResultSet will use RSImp1, effectively by-passing error checking. If the client did not request that error checking be by-passed, the ResultSet will use RSImp2, which executes the error checks of Set A, and then calls RSImp1.

Since it is generally desirable to maintain compatibility with an interface specification, the question arises whether, if an interface specification contains an error check, by-passing the error check as described herein is compatible with the specification. There is no universal answer to this question. However, it may generally be observed that an interface specification is akin to a contract between the server and the client, and that action on the part of the server which is consistent with the notion of "contract" should be consistent with the interface specification. Therefore, if a server by-passes error checking at the request of a client, while making error checking available to other clients which do not request by-passing, compatibility with the interface specification is generally preserved. In other cases, error checks specified by an interface may be in the nature of warnings to the server that the client does not guarantee data, which the server may disregard if it chooses. Still other error checks specified by an interface may in the nature of functions which must be available to a client, but which do not necessarily have to be used; in these cases, the server may legitimately by-pass error checking unless the client specifically requests it.

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as data storage device 104.

Although a specific embodiment of the invention has been disclosed along with certain alternatives, it will be recognized by those skilled in the art that additional variations in form and detail may be made within the scope of the following claims:

What is claimed is:

1. A method in a server for responding to a request from a client, comprising the steps of:

receiving a request at the server of a first type according to an interface specification from a client, there being a pre-defined set of error checks performed at said server associated with requests of said first type;

responsive to the client accessing the server and the server receiving the request, selectively determining whether to perform a first error check of said pre-defined set of error checks with respect to said request;

responsive to said step of selectively determining whether to perform a first error check, if said selectively determining step determines not to perform said first error check, then responding to said request without performing said first error check; and responsive to said step of selectively determining whether to perform a first error check, if said selectively determining step determines to perform said first error check, then performing said first error check, and responding to said request based on results of said first error check.

2. The method of claim 1, wherein said step of selectively determining whether to perform a first error check comprises selectively determining whether to perform said first error check responsive to a direction from said client.

3. The method of claim 1, wherein said step of selectively determining whether to perform a first error check comprises the steps of:

maintaining metadata with respect to a plurality of clients of said server, said metadata including, with respect to each of said plurality of clients, at least one value; and accessing said at least one value corresponding to the requesting client in response to receiving said request to determine whether to perform said first error check.

4. The method of claim 3, wherein said at least one value of said metadata indicates performance of past requests from the corresponding client, said metadata being updated automatically by said server responsive to processing requests.

5. The method of claim 1, wherein said step of selectively determining whether to perform a first error check comprises selectively determining whether to perform said first error check with respect to at least some clients responsive to current workload of said server.

6. The method of claim 1, wherein said step of selectively determining whether to perform a first error check comprises selectively determining whether to perform said first error check with respect to at least some clients responsive to a random or distributed indicator.

7. The method of claim 1, wherein said interface specification comprises a Java Database Connectivity (JDBC) API.

8. A server program product for responding to a request from a client, said server program product comprising a plurality of processor-executable instructions recorded on a computer-readable medium, wherein said instructions, when executed by at least one central processor of a server computer system, cause the system to perform the steps of:

receiving a request at the server computer system of a first type according to an interface specification from a client, there being a pre-defined set of error checks performed at said server computer system associated with requests of said first type;

responsive to the client accessing the server computer system and the server computer system receiving the request, selectively determining whether to perform a first error check of said pre-defined set of error checks with respect to said request;

responsive to said step of selectively determining whether to perform a first error check, if said selectively determining step determines not to perform said first error check, then responding to said request without performing said first error check; and responsive to said step of selectively determining whether to perform a first error check, if said selectively determining step determines to perform said first error check, then performing said first error check, and responding to said request based on results of said first error check.

9. The server program product of claim 8, wherein said step of selectively determining whether to perform a first error check comprises selectively determining whether to perform said first error check responsive to a direction from said client.

10. The server program product of claim 8, wherein said step of selectively determining whether to perform a first error check comprises the steps of:

maintaining metadata with respect to a plurality of clients of said server computer system, said metadata including, with respect to each of said plurality of clients, at least one value; and accessing said at least one value corresponding to the requesting client in response to receiving said request to determine whether to perform said first error check.

11. The server program product of claim 8, wherein said step of selectively determining whether to perform a first error check comprises selectively determining whether to perform said first error check with respect to at least some clients responsive to current workload of said server computer system.

12. A computer system, comprising:

a client interface for receiving and responding to requests from a plurality of clients;

a memory;

at least one programmable processor coupled to said memory and said interface;

a server application resident in said memory and which executes on said at least one programmable processor, said server application responding to client access and requests using data available to said computer system, said server application selectively determining, with respect to said requests, whether to perform at least one error check of a pre-defined set of error checks associated with said requests, (a) wherein, with respect to requests for which said server application determines not to perform said at least one error check, said server application responds to the requests without performing said at least one error check, and (b) wherein, with respect to requests for which said server application determines to perform said at least one error check, said server application responds to the requests based on results of said at least one error check.

13. The computer system of claim 12, wherein said client interface receives and responds to requests via the Internet.

14. The computer system of claim 12, wherein said system receives and responds to requests of a plurality of types, each type of request having a corresponding associated set error checks, and wherein said server application selectively determines, with respect to a plurality of types of requests, whether to perform at least one error check of a set of error checks corresponding to the type of request.

15. The computer system of claim 12, wherein said requests conform to a Java Database Connectivity (JDBC) API.

16. The computer system of claim 12, wherein said server application selectively determines whether to perform at least one error check responsive to a direction from a requesting client.

17. The computer system of claim 12, further comprising:

metadata with respect to a plurality of clients of said server, said metadata including, with respect to each of said plurality of clients, at least one value, wherein said server application accesses said at least one value corresponding to a requesting client in response to receiving a request to determine whether to perform said at least one error check.

18. The computer system of claim 17, wherein said at least one value of said metadata indicates performance of past requests from the corresponding client, said metadata being updated automatically by said computer system responsive to processing requests.

19. The computer system of claim 12, wherein said server application selectively determines whether to perform at least one error check with respect to at least some clients responsive to current workload of said server.

20. The computer system of claim 12, wherein said server application selectively determines whether to perform at least one error check with respect to at least some clients responsive to a random or distributed indicator.

* * * * *